Feb. 21, 1950   F. S. BURROUGHS   2,497,846
LURE
Filed March 6, 1948

INVENTOR
Frederick S. Burroughs
BY
Pennie Edmonds Morton & Barrows
ATTORNEYS

Patented Feb. 21, 1950

2,497,846

UNITED STATES PATENT OFFICE 2,497,846

LURE

Frederick S. Burroughs, Sparta, N. J., assignor to F. S. Burroughs Co., Inc., Dover, N. J., a corporation of New Jersey Application March 6, 1948, Serial No. 13,359

3 Claims. (Cl. 43—42.06)

1

This invention relates to lures for use in fishing, and is concerned more particularly with a novel lure which, when afloat upon or beneath the surface of the water, performs a succession of motions as a result of repeated localized changes in buoyancy.

The new lure may be of various forms and made of materials of different kinds but preferably it comprises an elongated buoyant body having means near one end for attachment to a line, and hooks dependent from its sides or bottom. The body, preferably of wood, contains a chamber lying offset from the axis of the buoyancy of the body and having an access opening, ordinarily at one end. The body is so formed or weighted that, when it is initially put afloat, the chamber is submerged and the opening is below the level of the top of the chamber. The chamber contains a mass, for example, in the form of a pellet, of a substance capable of emitting gas upon contact with water and, when the lure is first cast and begins to float, water rises into the chamber through the opening to wet the substance. The gas emitted by the substance is trapped within the chamber and forces out the water therein. As a result, the buoyancy of the part of the lure containing the chamber increases and, since the chamber lies entirely to one side of a vertical line passing through the center of buoyancy, the lure swings about a horizontal axis until the opening is in such position that the gas can escape. When the gas is thus released, the part of the lure containing the chamber sinks to permit water to enter the chamber, and the cycle of operations is repeated. The movements of the lure produced by the emission of gas when it is afloat, continue regularly, until the gas emitting substance is consumed, whereupon a new pellet of the substance is inserted in the chamber and the lure is ready for further use.

For a better understanding of the invention, reference may be made to the accompanying drawing, in which Fig. 1 is a view, partly in side elevation and partly in section, showing one form of the lure afloat and immediately after it has been cast;

Figure 1:
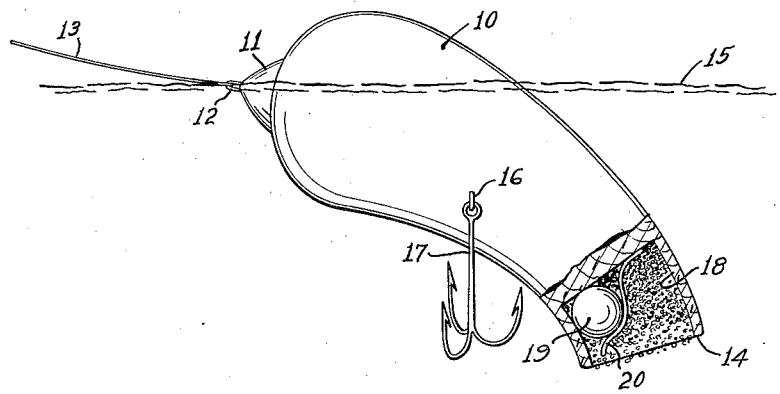
Figure 2:
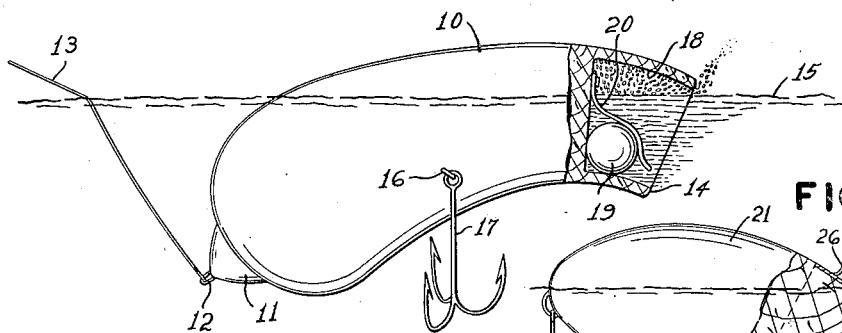
Fig. 2 is a view similar to Fig. 1, showing the position of the lure, when the lure has swung to permit escape of the gas.
Figure 3:
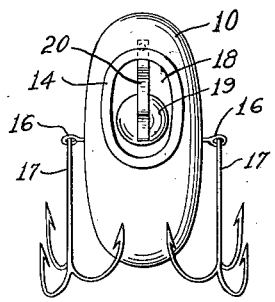
Fig. 3 is a view of the lure in rear elevation.

The lure in the form illustrated in Figs. 1–3, inclusive, comprises a body 10, which is buoyant and preferably made of wood. The body is of elongated form and generally oval in cross section, although the specific form illustrated is not critical. The body is provided at its front end with a cap 11 having an eye 12, by which the lure may be attached to a line 13, and the shape or weight distribution of the lure is such that the rear end 14 is submerged a substantial distance below the surface of the water, indicated at 15, when the lure is first put afloat. At its sides, the lure is provided with eyes 16, to which hooks, such as the multiple hook 17, may be attached.

The lure is provided with a chamber which lies entirely to one side of a vertical line passing through the center of buoyancy of the lure and, in the construction shown in Fig. 1, the chamber 18 is formed in the rear end of the lure and has an opening at that end. The position of the chamber in the lure is such that, when the lure is first put afloat, the chamber is wholly submerged and the opening lies below the level of the top of the chamber, so that water may rise within the chamber. If desired, the body of the lure may be weighted to insure that the lure will float initially with the chamber submerged, as described, or with the entire lure submerged.

Before the lure is put into use, a mass, such as a pellet 19, of a substance which emits gas upon contact with water, is inserted in the chamber and the lure is provided with means, such as a spring clip 20, which serves to hold the pellet in place. There are various substances which emit gas upon contact with water, but I prefer to employ pellets of calcium hydride or a mixture containing calcium hydride. On contact with water, the hydride emits hydrogen.

When the lure is cast by the fisherman and assumes the position illustrated in Fig. 1, the water rising through the opening into the chamber causes the emission of gas from the pellet and the gas collects in the top of the chamber and begins to force water out of the chamber through the opening. The displacement of the water by the gas changes the buoyancy of the rear end of the lure with the result that this end begins to rise, until ultimately the lure assumes the position shown in Fig. 2, with the opening in such a position that the gas escapes from the chamber. Water then enters the chamber and the rear end of the lure again submerges. The emission of gas continues and each time a sufficient amount of water is forced from the chamber by the gas, the rear end of the lure rises to permit the gas to escape. As a result, the lure appears to be animated and the succession of rising and falling movements of the rear end of the lure continues until the pellet has been consumed.

Figure 4:
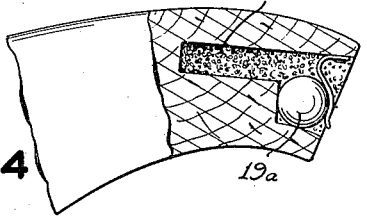
Fig. 4 is a fragmentary view, partly in side elevation and partly in section, of a modified construction.

In the lure shown in Figs. 1-3, inclusive, the chamber occupies substantially the entire rear end of the lure, but, if desired, the chamber may have a part, within which a pellet 19a is disposed, and an extension 21 leading inwardly lengthwise of the lure, as shown in Fig. 4. The action is the same as in the Fig. 1 construction.

Figure 5:
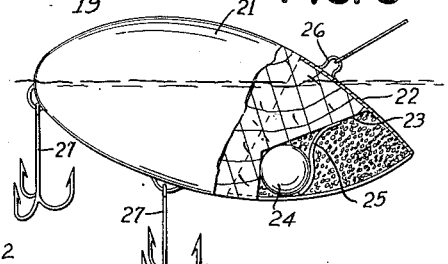
Fig. 5 is a view, partly in side elevation and partly in section, of another modified construction.
Figure 6:
Fig. 6 is an end view of the lure shown in Fig. 5.

The lure illustrated in Figs. 5 and 6 comprises a body 21 of a buoyant material having a metal hood 22 enclosing one end of the body and projecting beyond that end. The end wall 23 of the body within the hood is formed with an overhang and a pellet 24 of gas-emitting substance may be placed within the hood and held in position against the end wall beneath the overhang by a leaf-spring 25. The lure normally floats with the open forward end of the hood pointing downwardly, so that water can rise into the hood and reach the pellet. The gas emitted by the pellet is trapped within the hood and, when a sufficient quantity of gas has collected, the hooded end of the lure rises to permit the gas to escape, as in the prior constructions. The body 21 is provided with an eye 26 for attachment to a line and hooks 27 are attached to the bottom of the body to depend therefrom.

In all constructions, the movement of the lure depends on the positioning of the chamber, so that there is a change in buoyancy of the body of the lure at a location at one side of a vertical line passing through the center of buoyancy of the body.

The new lure may be constructed, so that it floats approximately at the surface of the water, or it may be weighted, so that, when it is cast, it will float beneath the surface of the water. In either construction, the action is the same, with the emitted gas collecting within the chamber and raising the chambered portion of the lure to permit the escape of the gas.

I claim:

1. A fishing lure which comprises a buoyant body having a chamber lying completely at one side of a vertical line passing through the center of buoyancy of the body, said chamber having an access and gas discharge opening at one end of the lure, the chamber being adapted to be submerged with the opening below the level of the top of the chamber when the body initially is floated, said chamber being adapted to contain a substance capable of emitting gas upon contact with water entering the chamber when the body is floated, said opening being completely below the top surface of the lure and of such size that it can emit at one discharge sufficient gas to cause a sudden shift vertically in the position of the end of the lure having said opening and the return of the lure to its initial floating position, means for attaching a line to said body, and hooks attached to the body in a position to depend therefrom.

2. A fishing lure as set forth in claim 1 in which the buoyant body is elongated and the chamber and the access and gas discharge opening thereof are at the forward end of the body.

3. A fishing lure as set forth in claim 1 in which the buoyant body is elongated and the chamber and the access and gas discharge opening thereof are at the rear end of the body.

FREDERICK S. BURROUGHS.

REFERENCES CITED

The following references are of record in the file of this patent:

UNITED STATES PATENTS

| Number | Name | Date |
|---|---|---|
| 1,361,561 | Yancey | Dec. 7, 1920 |
| 1,659,129 | Asaro | Feb. 14, 1928 |
| 2,055,841 | Haislip | Sept. 29, 1936 |